July 19, 1960
C. S. FRITZ
2,945,299
DENTAL HANDPIECE
Filed Aug. 22, 1957
2 Sheets-Sheet 1
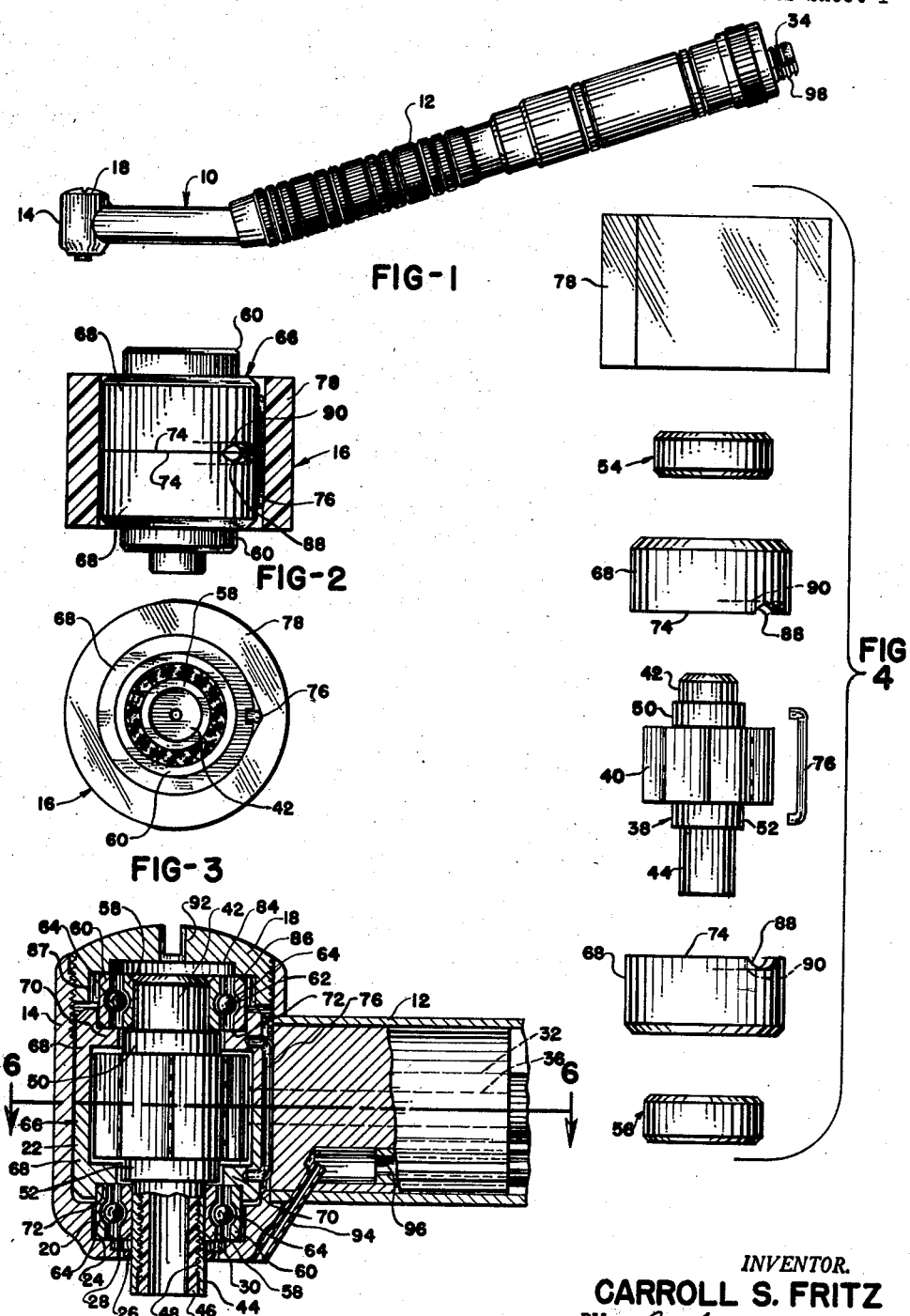
INVENTOR.
CARROLL S. FRITZ
BY
ATTORNEY July 19, 1960

C. S. FRITZ 2,945,299

DENTAL HANDPIECE

Filed Aug. 22, 1957

INVENTOR.
CARROLL S. FRITZ
BY
ATTORNEY

United States Patent Office 2,945,299
Patented July 19, 1960

2,945,299
DENTAL HANDPIECE

Carroll S. Fritz, 1574 Clover Lane, York, Pa.

Filed Aug. 22, 1957, Ser. No. 679,553

19 Claims. (Cl. 32—27)

This invention relates to improvements in dental handpieces and, more particularly, to dental handpieces embodying a rotatable turbine driven by compressed gaseous fluid, particularly for purposes of attaining very high speeds of the order of between 150,000 and 200,000 r.p.m. or higher.

The preferred handpiece construction of this type comprises a handle which may be either of the axial type or the contra-angle type through which gaseous fluid is directed under pressure to the head at the outer end of the handpiece and discharged gaseous fluid is transmitted through said handle to the outer end thereof either for free discharge or discharge into a conducting conduit. The head of the handpiece contains a relatively small, bladed turbine from which the blades extend radially so as to be engaged by gaseous fluid under pressure to rotate the turbine.

The turbine is supported adjacent opposite ends by small anti-friction bearing units respectively comprising inner and outer races between which a plurality of anti-friction ball bearing members are disposed. In view of the fact that it is desirable to have the head on the outer end of the handpiece of relatively small dimensions of the order of approximately ⅜ inch in diameter and ½ inch long or high, it will be seen that the head comprises a housing capable of containing a vaned turbine rotor supported in bearings of correspondingly small size. In one practical type of handpiece of such construction, said bearing units have an outer race of approximately ¼ inch in outer diameter, while the bore of the inner race is approximately ⅛ inch in diameter. The anti-friction ball bearings between said races are approximately 1 mm. in diameter.

In order that the desired attainable speeds of the turbine rotor may be achieved with a minimum of gaseous fluid under pressure, of the order of between 10 and 40 pounds p.s.i. for example, and particularly by using the gaseous fluid at a preferred and commonly available pressure of approximately 20 pounds p.s.i. in dental offices, the bearing units are of the type wherein a limited amount of clearance space or play is permitted between the bearing races and the anti-friction members. In the preferred construction, said play permits radial movement between the races of the order of approximately between .0002 and .005 inch, such relative movement also being permitted in an axial direction between the races. The purpose of providing such limited radial and axial movement between the races of the bearing units is to permit the anti-friction ball bearing members of the races as well as the vaned turbine rotor to actually float during normal operations, in the range of speeds mentioned above, upon a cushion of gaseous fluid such as air.

The only moving parts in a handpiece of this type are the rotor and the inner races and anti-friction bearing members of the bearing units. Actual wear will occur only on these components of the bearing units and the outer races thereof. Hence, particularly to facilitate the servicing of such a handpiece to replace any of said components which may be worn to such extent as to make replacement desirable, the present invention has been directed primarily to the structure of the rotor assembly of the handpiece to render the same easily mountable within and removable from the housing of the head of the handpiece.

In accordance with the foregoing, one of the objects of the present invention is to provide for a dental handpiece of the type described, several different embodiments of a cartridge-type turbine rotor assembly, all of which include a vaned rotor, upper and lower anti-friction bearing units connected to opposite ends thereof, and a casing which surrounds the vanes of the rotor and extends between the outer races of both bearing units to space said outer races axially a predetermined, precise distance so as to permit clearances between the anti-friction members of the bearing units and the annular ways therefor in the races of the units to be fully effective upon insertion of the turbine rotor assembly within the housing of the handpiece, the interengagement between the casing and the outer races of the bearing units being such as to seat and hold the outer races coaxial with the casing.

Another object of the invention is to provide in certain of the embodiments thereof a cartridge casing for the turbine rotor assembly which engages the outer races of the bearing units in such manner that bearing units having an outer diameter no greater than, and preferably smaller than the diameter of the vaned portion of the rotor, may be used so as to minimize peripheral speed of the movable members of the bearing units.

A further object of the invention is to provide a turbine rotor cartridge assembly in which the outer races of the bearing units are so mounted with respect to opposite ends of the cartridge casing of the rotor assembly that a clamping and closing cap for one end of the housing may be constructed so as to have a substantial cylindrical peripheral skirt or wall which is threadably connected to the inner wall of the housing, whereby said cylindrical peripheral portion of the cap will facilitate attachment of the cap to the housing and also provide extensive locking of the cap to the housing, such locking of the cap also securing the rotor cartridge assembly within the housing with the outer races firmly and stationarily secured relative to the housing and spaced axially a precise distance.

Ancillary to the foregoing object, it is a further object to utilize in several cartridge embodiments of the invention, bearing units provided with radially flanged outer races which respectively abut opposite ends of the cylindrical casing so as to accommodate a cap having a substantial cylindrical peripheral wall.

Still another object of the invention is to provide in one cartridge embodiment of the invention a bi-partite casing which extends between the outer races to space the same axially, a protecting sleeve being temporarily and removably connected to said bi-partite cartridge casing of the turbine rotor assembly so as to protect said cartridge assembly prior to being used in a handpiece and also hold the sections of said casing and keying means therefor assembled until insertion thereof into the housing of the handpiece.

Details of the foregoing objects and of the invention, as well as other objects thereof, are set forth in the following specification and illustrated in the accompanying drawings comprising a part thereof.

In the drawings:

Fig. 1 is a side elevation of an exemplary dental handpiece shown approximately in full scale, said handpiece being of the fluid-operated turbine type embodying the principles of the present invention.

Fig. 2 is a side elevation, on a considerably larger scale than Fig. 1, of a cartridge-type turbine rotor assembly arranged in condition for storage or shipping, as well as for assembly within the housing at the outer end of the handpiece shown in Fig. 1. This assembly also includes an outer, synthetic resin sleeve which holds certain parts of the assembly together until the assembly is to be inserted within the housing of the handpiece.

Fig. 3 is a top plan view of the turbine rotor assembly shown in Fig. 2.

Fig. 4 is a vertical exploded side elevation of the various components of the turbine rotor assembly shown in Figs. 2 and 3.

Fig. 5 is a vertical sectional elevation of a fragmentarily illustrated head end portion of the handpiece shown in Fig. 1 and illustrating details of the present invention on a still larger scale than employed in Figs. 2 through 4.

Figure 6:
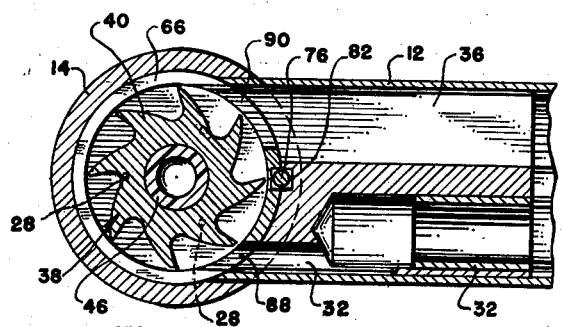
Fig. 6 is a horizontal sectional plan view of the fragmentary outer head end of the dental handpiece similar to that shown in Fig. 5 but taken on the line 6—6 of the latter figure.
Figure 7:
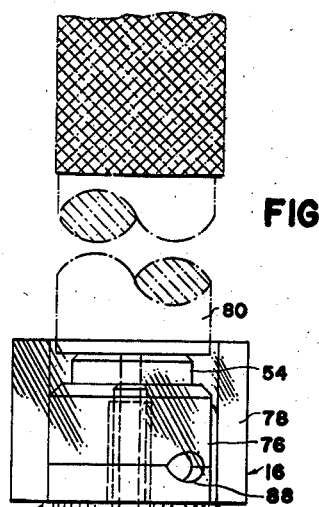

Fig. 7 is an exemplary side elevation of the fragmentary head end of the dental handpiece shown in Figs. 5 and 6 with the turbine rotor assembly in process of being inserted into the head of the handpiece by the aid of a foreshortened and fragmentary portion of a special tool used for the purpose, this view also showing in exploded manner the cap which secures the turbine rotor assembly in operative position within the housing of the head end of the handpiece.

Figure 8:
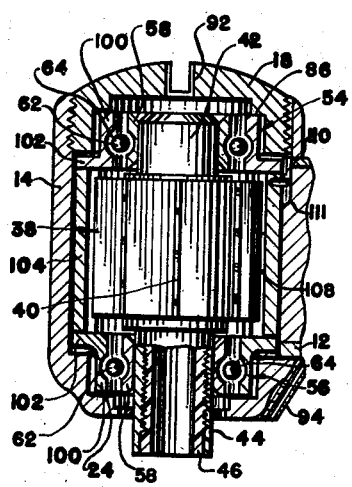

Fig. 8 is a view similar to Fig. 5 but illustrating another embodiment of turbine rotor assembly employing the principles of the present invention.

Figure 9:
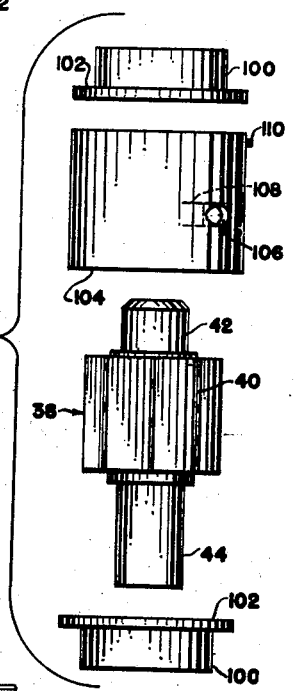

Fig. 9 is an exploded side elevation of the turbine rotor assembly shown in Fig. 8.

Figure 10:
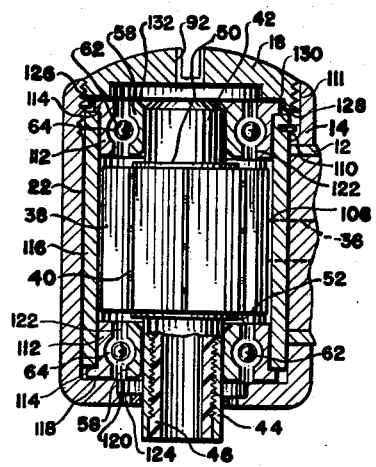

Fig. 10 is a vertical sectional view of still another embodiment of the turbine rotor assembly.

Referring to the drawings, the dental handpiece 10 shown in Fig. 1 comprises a handle 12 and a head 14 comprising preferably a cylindrical housing which receives the turbine rotor assembly 16, shown in exploded manner in Fig. 4. The dental handpiece 10 specifically illustrated in Fig. 1 comprises a contraangle type handpiece in which the axis of the portion of the handle immediately adjacent the head 14 is at an obtuse angle to the axis of the outer portion of the handle 12.

The interior of the head or housing 14 preferably is cylindrical, the upper portion of the wall of the cylindrical interior being threaded to receive an externally threaded cap 18. The lower portion of the head 14 as viewed in Figs. 1 and 5, is provided with a cylindrical recess 20 of smaller diameter than the cylindrical interior 22 of housing 14 and in axial alignment therewith, the lower end of cylindrical recess 20 being defined by a transversely extending wall comprising a lower seat 24. The bottom of the housing 14 also is provided with a central aperture 26 and a plurality of circumferentially spaced fluid outlet ports 28 are formed within the bottom of housing 14 and communicate with an annular relief space 30 for purposes to be described.

Referring particularly to Fig. 6, it will be seen that the portion of the handle 12 which immediately connects with the housing 14 is provided with a fluid inlet conductor 32, the outer end 34 of which is connectable, for example, with a flexible conduit through which gaseous fluid such as air is conducted to the head 14. The handle 12 also is provided with a fluid discharge opening 36 extending longitudinally of the handle 12 and through which gaseous fluid is discharged from the head 14 during the operation of the turbine rotor to be described. The exiting gaseous fluid which passes through discharge opening 36 enters the atmosphere through the outer end of handle 12 after first passing through suitable filter or muffling means, if desired.

The turbine rotor cartridge assembly 16, in the embodiment illustrated in Figs. 2 through 7, comprises a turbine rotor 38 having radially extending vanes 40 intermediately of the ends of the turbine rotor, an upper shaft portion 42 on the rotor being in axial alignment with a lower shaft portion 44. The lower shaft portion 44, as seen in Fig. 5, also comprising a chuck which receives the shank of a dental bur for example. The shaft portion 44 is axially bored inwardly from the lower end thereof to receive a resilient sleeve liner 46 which may be formed from suitable synthetic resin, the liner being held against relative axial movement with the shaft of the rotor by means of threads 48 formed on the interior of the bore within the shaft portion 44.

If desired, a plurality of annular bosses 50 and 52 may be formed upon the rotor shaft respectively adjacent opposite ends of the vanes 40 as shown in Figs. 4 and 5. The shaft of the rotor 38 is supported at opposite ends thereof respectively by an upper anti-friction bearing unit 54 and a lower anti-friction bearing unit 56. Said anti-friction bearing units respectively comprise inner races 58 and outer races 60, there being annular spaces between the inner faces of the inner and outer races and curved annular ways or seats respectively are formed on said inner faces of the inner and outer races for purposes of receiving a plurality of anti-friction ball bearing members 62. For convenience, the upper and lower anti-friction bearings units 54 and 56 are identical but this is not mandatory in the event different sizes are preferred.

As will be seen from Fig. 5 particularly, there is illustrated, in exaggerated form, clearance spaces 64 between the ball bearing members 62 and the annular ways within the inner faces of the inner and outer races of both bearing units 54 and 56. As stated hereinabove, such clearance spaces are so dimensioned that radial and axial movement of the order of between .0002 and .005 inch is permitted between the inner and outer races of each of the bearing units. These clearance spaces are preferred in order that gaseous fluid, under pressure, is present within the head of the handpiece while operating at speeds for example of between 150,000 and 200,000 r.p.m. so as to effect gaseous cushions between the ball bearing members 62 and the annular ways or seats therefor within the inner and outer races of the bearing units, the result being that the vaned turbine also, in effect, will float on a cushion of gaseous fluid, such as air, when operating at the aforementioned speeds. Such floating action of the turbine rotor results in either greatly minimizing or totally eliminating trauma to a patient resulting from vibration of the turbine rotor and bur or other dental tool carried thereby when operating at the speeds referred to above.

It will be understood that, preferably, the turbine rotor is dynamically balanced when manufactured and the floating of the same upon a cushion of air while operating at the aforementioned speeds substantially totally eliminates any vibration of the turbine rotor during operation thereof at such speeds.

In assembling the bearing units 54 and 56 upon the turbine rotor 38, the inner races 58 of said bearing units are press-fitted respectively upon opposite ends 42 and 44 of the shaft of the rotor. However, before pressing said bearing units relative to the rotor, spacing means comprising a bi-partite cartridge casing 66, composed preferably of similar casing sections 68, first is mounted upon the rotor so as to enclose the vanes thereof.

The similar cartridge casing sections 68 are shaped as best shown in vertical sectional view in Fig. 5, each of said sections having an annular flange 70 extending radially inwardly, the inner extremity of said flanges terminating preferably approximately midway of the annular space between the inner and outer races of each of the bearing units 54 and 56 as is clearly shown in Fig. 5. The flanges 70, being spaced inwardly from the outer ends of casing sections 68, form annular seats 72 which respectively receive the inner ends of the outer races of each of the bearing units, as shown in Fig. 5, the outer peripheries of the inner end of each outer race also preferably engaging the inner cylindrical surface of the outer ends of the casing sections 68 with limited friction, by light press-fitting. The seats 72 thus precisely position the bearing units coaxially with the casing 68. Also, this arrangement of casing provides a cylindrical wall which surrounds the vanes of the rotor while also providing an annular seat at each end of the casing to receive the outer race of a bearing assembly which is no greater in diameter and preferably is smaller in diameter than the vaned portion of the rotor to minimize the preferred speed of the anti-friction bearing members 62 during operation of the rotor.

When the cartridge casing sections 68 of casing 66 are mounted in operative position as shown in Figs. 2 and 5, the inner surfaces 74 abut end-to-end. When so abutting, the seats 72 at the opposite ends of the casing 66 will be spaced axially a precise predetermined distance so as correspondingly to space axially the outer races of the bearing units 54 and 56. Hence, in assembling the turbine rotor cartridge unit or assembly 16, the sections 68 of casing 66 first are placed together so as to enclose the vanes 40 of the rotor 38 and, while the outer ends of the inner and outer races of both of the bearing units 54 and 56 are held precisely within flat planes extending transversely of the axis of the rotor, the bearing units are pressed onto the opposite ends of the rotor 38 until the inner ends of the outer races of the bearing units abut respectively the annular seats 72 in the outer opposite ends of the casing 66.

Meanwhile, the inner races of the bearing units are frictionally press-fitted respectively upon the upper and lower shaft portions 42 and 44. Thus, the press-fitting of the inner races upon the shaft of the rotor in the manner described will maintain the same spaced axially the same precise, predetermined distance as the seats 72 maintain the outer races of the bearing units spaced axially. As a result of this, the clearance spaces 64 between the ball bearing members 62 and the curved annular ways or seats therefor in the inner and outer races of both bearing units are fully preserved when all components of the turbine rotor assembly 16 have been united as described above.

From Fig. 5, it will be seen that in the preferred construction of the cartridge embodiment shown in Figs. 1 through 7, the outer ends of the outer races of both bearing units 54 and 56 project respectively beyond the outer ends of cartridge casing 66. Extending preferably in an axial direction between both sections 68 of the cartridge casing 66 is a key member 76, the opposite ends of which are bent substantially at a right angle to the intermediate portion of the key and said bent ends respectively are received within suitable holes extending radially inward from the cylindrical outer surface of the sections 68 comprising cartridge casing 66 as best shown in Fig. 5. After the turbine rotor cartridge unit or assembly 16 has been arranged as shown in Figs. 2 and 3 for example, the key 76 may conveniently be maintained in operative position relative to the casing 66 by a flexible sleeve 78 formed from tubular synthetic resin for example which is stretchable sufficiently to frictionally engage the exterior of casing 66 and key means 76. In this condition, the cartridge assembly 16 may be stored until ready for use.

When the cartridge assembly 16 is to be positioned within the cylindrical interior 22 of housing 14, the lower end thereof is disposed partially within the open upper end of housing 14 when the cap 18 has been removed. Such initial assembly is illustrated in exemplary manner in Fig. 7. For convenience, an auxiliary pushing tool 80 is pressed against the upper end of the outwardly projecting upper bearing unit 54 for example and the lower end of sleeve 78 will abut the upper end of housing 14.

By such operation, the cartridge casing 66 is moved axially relative to the sleeve 78 until the lower end of key 76 is exposed and may be aligned with an axially extending indexing groove 82, best shown in Fig. 6, following which the casing 66 and the turbine rotor and bearing units assembled therewith are moved fully in an axial direction into the housing 14 until the lower end of the outer race 60 of the lower bearing abuts the lower seat 24 within housing 14 as shown in Fig. 5. The clearance between the exterior of cartridge casing 66 and interior of housing 14 preferably is of the order of several thousandths of an inch to provide for easy insertion, yet establish coaxial arrangement of the cartridge rotor unit within housing 14.

The interior of cap 18 is preferably provided with a central recessed portion 84, see Fig. 5, of greater diameter than the outer diameter of the inner race 58 of the upper bearing unit 54, whereby an annular shoulder 86 within the cap abuts the upper end of the outer race 60 of the upper bearing unit. The annular shoulder 86 is formed a substantial distance inwardly from the inner end of cap 18, whereby a peripheral skirt 87 of substantial length is provided. The exterior of said skirt is threaded to engage complementary internal threads in the housing 14, thus facilitating the attachment of the cap to the housing and minimizing the misengagement of the threads.

When the cap 18 is threaded into the originally open upper end of housing 14 sufficiently to abut the upper end of outer race 60 of the upper bearing unit of the cartridge assembly, it will force said outer race firmly against the seat 72 in the upper end of casing 66, whereupon the seat 72 in the lower end of casing 66 will firmly abut the upper end of outer race 60 of lower bearing unit 56, resulting in the lower end of outer race 60 of said lower bearing unit being firmly pressed against seat 24 in the bottom of housing 14. Hence, such operation will accurately space the outer races of both bearing units precisely in an axial direction determined by the axial spacing of the seat 72 in the opposite ends of casing 66. Such disposition of the outer races is accomplished easily and quickly, as well as with precision, whereby the clearance spaces 64 will be present to the full effect within both the upper and lower bearing units 54 and 56 and the turbine assembly will be enclosed within the housing 14 by cap 18. Such clamping of the turbine cartridge unit within the housing 14 also results in stationarily locking the outer races of both bearing units relative to casing 14, while the inner races which are fixed to the rotor are freely rotatable relative to the outer races of the bearing units and the housing 14 as the rotor 38 is driven by gaseous fluid.

The use of key means 76 is preferred in order that fluid inlet port 88 formed jointly within the sections 68 of cartridge casing 66 will be axially aligned with fluid inlet conductor 32 in handle 12, while the fluid exhaust port 90, formed jointly in the sections 68 of casing 66, will be aligned axially with the fluid discharge opening 36 in handle 12.

Notwithstanding the fact that the annular bosses 50 and 52 are formed on the rotor 38, the same are not intended as seating means to control the position of the inner races of the bearing units relative to the shaft of rotor 38. Rather, the bosses 50 and 52 control the flow of fluid through the housing and minimize eddy currents and turbulence. The positioning of said inner races upon the shaft of said rotor is controlled entirely by the frictional engagement of the races with the opposite ends of the shaft of rotor 38 when the same are being press-fitted upon the shaft coincidently with the outer races of the bearing units being brought into firm abutment with the seats 72 of casing 66, as described above.

When gaseous fluid is introduced under pressure such as described above to the interior of housing 14 by means of fluid inlet conductor 32 within the handle, such fluid will enter the cartridge casing 66 through inlet port 88 and engage the vanes 40 of the rotor 38 successively so as to rotate the rotor at the high speeds within the ranges described above. A predetermined amount of pressure will be maintained substantially at all times within the cartridge casing 66 when the handpiece is operating and the fluid will discharge partially from the interior of casing 66 through the spaces between the peripheries of bosses 50 and 52 and the adjacent terminal surfaces of annular flanges 70 which define the seats 72 in the opposite ends of casing 66. Such constricted passages are preferred in order to permit expansion of the gaseous fluid when it enters the spaces between the inner and outer races of each of the bearing units 54 and 56, whereby the ball bearing members 62 of said races will be cooled adequately, especially when rotating at the high speeds referred to above. In accordance with the contemplated operation of the dental handpiece, liquid lubricant also is mixed with the gaseous fluid introduced to the housing of the handpiece and the casing 66 therein, whereby the ball members 62 also will be lubricated.

After the gaseous fluid is discharged from the outer ends of both of the bearing units 54 and 56, said fluid respectively will be discharged through a central opening 92 formed in cap 18 and the fluid outlet ports 28 in the bottom of housing 14, whereby the latter discharge of gaseous fluid will be directed against a bur or other tool held in the chuck end 44 of the turbine rotor, thus serving to cool said bur or other tool.

The handpiece also includes a water spray arrangement having an outlet nozzle 94 which communicates with a water conduit 96 within handle 12, the outer end 98 of which, as shown in Fig. 1, may be connected with a suitable flexible tube or conductor, not shown, this in turn being connected to a source of water as is available in all dental offices. The discharge of water through outlet nozzle 94 is directed against the bur or other tool held by the chuck end 44 of the turbine rotor, thereby further cooling the same and also flushing a tooth cavity, for example, being drilled or formed by the bur.

Illustrated in Figs. 8 and 9 is another embodiment of cartridge-type, fluid-operated turbine rotor assembly which may be employed in the handpiece 10 illustrated in in Fig. 1 for example. The embodiment illustrated in Figs. 8 and 9 has possible manufacturing advantages over the embodiment illustrated in Figs. 2 through 7 and, depending upon manufacturing equipment available to a manufacturer, may be preferred to the first described embodiment, or vice versa.

In the embodiment shown in Figs. 8 and 9, the assembly of the inner races of the bearing units 54 and 56 relative to the upper and lower shaft portions 42 and 44 is the same as in the embodiment shown in Figs. 2 through 7. However, the outer races 100 of the bearing units are of the type which are provided with radially extending flanges 102, preferably projecting from the inner ends of the outer races 100.

By the use of flange-type outer races 100, as shown in Fig. 8 particularly, a very simple type of cylindrical cartridge casing 104 may be utilized which may be cut from standard metallic tubing for example of suitable diameter and wall thickness, the ends of the casing 104 however being smoothly formed and disposed within very flat parallel planes respectively in order to form firm abutments of the opposite ends of casing 104 with the inner flat surfaces of radial flanges 102 on the outer races 100. Preferably, the outer diameter of cylindrical casing 104 is the same as the outer diameter of the radial flanges 102 of the outer races 100 of the bearing units.

Inasmuch as the inner races 58 of the upper and lower bearing units are press-fitted onto the opposite ends of the shaft of the rotor 38, and the outer races of the bearing units are inseparable axially from the inner races, the cartridge assembly comprising the turbine rotor 38, upper and lower bearing units, and casing 104 will normally be inseparable without the aid of special tools. As is evident from Fig. 8 particularly, there is provided only a very limited amount of space between interior of housing 14 and the exterior of both the cartridge casing 104 and the periphery of flanges 102 of the outer races of the bearing units, such space amounting preferably only to .001 or .002 inch. The thickness of the wall of casing 104 also is substantially greater than the clearance space between the casing and the tips of the rotor vanes. Hence, the bearing units shown in Fig. 8 will serve to center the rotor 38 relative to the housing 14 and, when mounted within the housing 14, the scant clearance between the interior of the housing and the exterior of casing 104 and flanges 102 will axially center the casing and bearing units within housing 14, whereby the positioning of the cartridge assembly within the housing will serve to space the interior of the casing 104 substantially evenly relative to the tips of the turbine vanes.

If desired, the exterior of the turbine rotor cartridge assembly illustrated in Figs. 8 and 9 may be enclosed within a protecting sleeve similar to sleeve 78 shown in the embodiment of Figs. 2 through 7, particularly for purposes of preventing dirt, dust, or other extraneous material from entering the interior of said cartridge assembly while the same is being stored or merchandised until ready for insertion into a handpiece.

The housing 104 also is provided with a fluid inlet port 106 and a fluid outlet port 108 which must be indexed or oriented relative to the fluid inlet conductor 32 and fluid discharge opening 36 within the handle 12 of the handpiece. Accordingly, indexing means of exemplary type such as a radially projecting pin 110 is pressed into a suitable hole formed in one wall of the casing 100, as seen in Figs. 8 and 9, the outer end of said pin being received within a vertical groove 111 formed within the inner wall of the housing 14 as seen in Fig. 8.

When the embodiment of cartridge assembly shown in Figs. 8 and 9 is inserted within the housing 14, the lower end of outer race 100 of the lower bearing unit 56 will abut the lower seat 24 in the housing 14. Upon screwing the cap 18 into the housing 14 so as to close the opening in the upper end thereof through which the assembly has been inserted, the interior annular shoulder 86 within the cap will abut the upper end of the outer race 100 of the upper bearing unit 54 as clearly shown in Fig. 8, also forcing the flanges 102 of both of the outer races of the bearing units into firm abutting relationship with the opposite ends of casing 104, thereby accurately positioning the outer races of the bearing units axially and precisely relative to each other and also will clamp the outer races stationarily relative to the housing 14. The assembly of the bearing units 54 and 56 onto the opposite ends of the shaft of the rotor 38 in the embodiment of Figs. 8 and 9 is similar to that when takes place relative to the embodiment shown in Figs. 2 through 7, whereby the clearance spaces 64 between the ball bearing members 62 and the curved annular ways or seats therefor in the inner and outer races will be maintained when the rotor assembly is positioned operatively within the housing 14 and clamped therein by cap 18.

Features of the embodiment shown in Figs. 8 and 9 which are not described in further detail than set forth above are similar to corresponding features in the embodiment shown in Figs. 2 through 7 and the operation of the cartridge embodiment in Figs. 8 and 9 is otherwise the same as that of the said first-described cartridge embodiment.

Fig. 10 illustrates still another embodiment of cartridge-type rotor assembly which is similar to the embodiment shown in Figs. 8 and 9 in that the embodiment shown in Fig. 10 also uses anti-friction bearing units having outer races provided with radial flanges. However, the embodiment illustrated in Fig. 10 has the additional advantage characteristic of the embodiment shown in Figs. 1 through 7, namely, that the casing of the rotor assembly positions the outer races of the bearing units coaxially with the casing in accordance with details set forth hereinafter.

Referring to Fig. 10, it will be seen that the handle 12, which is only fragmentarily illustrated therein, casing 14, turbine rotor 38, and the inner races 58 of the upper and lower anti-friction bearing units are substantially the same as corresponding elements illustrated and described relative to the embodiment shown in Figs. 2 through 7 as well as the embodiment shown in Figs. 8 and 9. Hence, in Fig. 10, these elements which are common to the other embodiments are designated by the same reference characters.

As distinguished from the embodiment shown in Figs. 8 and 9, it will be seen that the embodiment of Fig. 10 utilizes upper and lower anti-friction bearing units having outer races 112 on which annular, radial flanges 114 project from the upper end of upper race 112 and the lower end of the lower outer race 112. For convenience, the outer races 112 respectively of the upper and lower bearing units preferably are identical.

Extending coaxially between the outer races 112 of the upper and lower bearing units is a preferably cylindrical and tubular casing 116 which is similar to casing 104 of Figs. 8 and 9 except that it is longer. Further, the outer races 112 preferably have an outer diameter which is slightly greater than the inner diameter of casing 116 in order that there may be a light press fit between the outer races and the opposite ends of casing 116 when the bearing units, rotor 38, and casing 116 are being assembled in a manner similar to that described in regard to the assembly of the embodiment shown in Figs. 8 and 9. Hence, the outer ends of both the inner and outer races of the bearing units in Fig. 10 are held accurately within a plane transverse to the axis of rotor 38 while the inner race 58 of the upper bearing unit is being pressed upon the upper shaft portion 42 a predetermined amount. Following this, the lower bearing unit, for example, next is press-fitted upon the lower shaft portion 44 of the rotor 38 while the outer ends of the inner and outer races of the lower bearing unit likewise are held precisely within a plane extending transversely to the axis of rotor 38. The pressing of the second bearing unit upon lower shaft portion 44, for example, will continue until radial flanges 114 on the outer races of the upper and lower bearing units abut the opposite ends of casing 116, whereby the casing 116 serves as a spacing means for the bearing units.

Inasmuch as the casing 116 serves to space the outer races 112 of the upper and lower bearing units axially a precise distance, and the inner races 58 have been press-fitted onto opposite ends 42 and 44 of the rotor 38, whereby they are spaced axially the same distance as the outer races 112, the clearance spaces 64 between the anti-friction ball bearing members 62 and the annular curved ways or seats therefor, which are formed on the inner faces of the inner and outer races of both of the bearing units, will be preserved in the assembled elements of the cartridge-type rotor assembly. The clearance space 64 is illustrated in Fig. 10 in exaggerated manner, similar to the manner of illustration in Figs. 5 and 8.

The lower portion of housing 14 in Fig. 10 is provided with a slightly different form of lower seat 118 from the lower seat 24 shown in Fig. 8. The lower seat 118 necessarily is larger in diameter than the seat 24, due to the fact that the flange 114 is arranged on the lower end of the outer race 112 of the lower bearing unit in Fig. 10. Seat 118 also includes an annular recess 120, the cylindrical wall of which preferably substantially bisects the annular space 122 between the inner and outer races 58 and 112 of the lower bearing unit, particularly for purposes of providing a restricted discharge of gaseous fluid such as air through said space, said air exiting from the housing 14 through a plurality of circumferentially spaced discharge ports 124. The discharge ports 124 are arranged around the lower shaft portion 44 of the rotor 38 in a manner similar to that illustrated in Fig. 6 in regard to discharge ports 28.

The exterior of casing 116 is complementary to the cylindrical interior 22 of housing 14, said interior 22 preferably being only several thousandths of an inch larger in diameter than the outer diameter of casing 116, whereby when the cartridge-type rotor assembly is mounted within the housing 14, the assembly will substantially be disposed concentrically within housing 14. Further, it will be understood that the casing 116 will be provided with inlet and discharge ports for gaseous fluid similar to the ports 106 and 108 of casing 104 shown in Fig. 9. Similar indexing means to those shown in Fig. 9 also are provided relative to casing 116 and housing 14 of Fig. 10, wherein an exemplary pin 110 and complementary, axially extending groove or slot 111 is shown.

Particularly in order that the cap 18 may have a peripheral skirt 126 of substantial length, so that a considerable peripheral area may be provided on the cap for threading thereof complementarily to the threads provided on the interior of the upper end of housing 14, the outer diameter of the radial flanges 114 on the outer races of the bearing units preferably is less than the outer diameter of casing 116 but greater than the inner diameter thereof, whereby the flanges 114 will provide radial shoulders which will abut endwise the opposite ends of casing 116. Such decrease in the outer diameter of flanges 114 will provide a space 128 which will accommodate the inner end of peripheral skirt 126 on the cap 18 but the cap 18 also has an annular shoulder 130 which will abut the upper face of the outer race 112 so as to force the outer race of the lower bearing unit against lower seat 118 by reason of the casing 116 extending between the flanges of the outer races of both the upper and lower bearing units. The vertical dimension of the flanges 114 is greater than the length of the peripheral skirt 126 on the cap in order to prevent the inner end of said skirt from engaging the upper end of casing 116.

Annular shoulder 130 on cap 18 is partially defined by a shallow circular cavity 132 through which gaseous fluid such as air discharges from the annular space between the inner and outer races of the upper bearing unit, such gaseous fluid exiting through central aperture 92 formed in the cap as in relation to the embodiments shown in the preceding figures.

The casing 116 may be formed inexpensively simply by being cut from tubing of desired diameter and wall thickness formed from suitable metal or otherwise. The opposite ends of the casing 116 preferably should be precisely parallel to each other and transverse to the axis of the casing. However, the length of the casing may have a tolerance of the order of one or two thousandths inasmuch as ample clearance is provided on the rotor between the bosses 50 and 52 and the inner ends of the inner races 58 of the upper and lower bearing units so that assembly of the cartridge-type rotor assembly may be accomplished in the manner described above so as to preserve the clearance spaces 64, notwithstanding the fact that there is some tolerance permitted in the length of the casing 116.

While the various cartridge embodiments illustrated and described in this application are generally intended for similar purposes, the details respectively shown in said embodiments are not identical and offer manufacturing advantages over each other in different degrees, particularly in regard to maintaining tolerances of dimensions, manufacturing costs, ease of assembly, and other characteristics.

It will be seen from the foregoing that the present invention provides a plurality of embodiments of cartridge-type turbine rotor assemblies which respectively include a vaned rotor, both upper and lower anti-friction bearing units having the inner races thereof press-fitted onto the opposite ends of the rotor shaft, and spacing means comprising a casing which extends between the outer races of the bearing units so as to space the same axially a predetermined distance. Said spacing of the outer races controls the axial spacing of the inner races upon the shaft of the rotor during the assembly of the elements recited above, whereby clearance space provided in the anti-friction bearing units between the anti-friction members thereof and the annular curved ways or seats therefor in the races of the bearing units is maintained when said elements have been assembled as well as when the assembly is mounted in the housing of the handpiece and is locked therein by a cap.

Several of the cartridge embodiments provide means by which the outer races of the bearing units are maintained concentric with the casing spacing member. Further, the construction of all of the cartridge embodiments is such that a cap may be utilized which has a substantial skirt portion, the peripheral outer surface of which is threaded in order to provide a substantial threaded area for engagement with complementary threads in the interior of the upper end of the housing of the handpiece.

Still further, several of the cartridge embodiments also utilize outer races having radially extending flanges thereon which abut opposite ends of the cylindrical casing or spacing member, thus providing a construction which may utilize conveniently the cap having an annular skirt portion referred to above. The use of such flange-type bearings also permits the use of bearing units having a smaller diameter in general, except for the flange, than the outer diameter of the vaned portion of the rotor, such arrangement affording less peripheral speed of the anti-friction bearing members of the bearing units than if units of a larger diameter were used as, for example, where the outer diameter of the outer race of each bearing unit is greater than the diameter of the vaned portion of the rotor in order that the opposite ends of the casing or spacing means may directly abut the outer races of the bearing units.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A dental handpiece comprising in combination, a handle having a housing on one end thereof connected thereto and provided with an opening therein; a fluid operated turbine rotor cartridge assembly comprising a fluid operated turbine rotor having vanes intermediately of the ends thereof, anti-friction bearing units having inner and outer races, the inner races thereof respectively receiving concentrically the opposite ends of said rotor, a casing surrounding the vanes of said rotor, the opposite end portions of said casing having seats respectively receiving the outer races of said bearings to maintain the same coaxial with said casing and maintain said races spaced axially a predetermined precise distance, said cartridge assembly being removably mounted operatively within said housing and positionable therein as a unit by insertion thereof through said opening; and means engaging said housing and assembly and operable to secure said cartridge assembly in operative position within said housing.

2. The dental handpiece set forth in claim 1 further characterized by said seats of said casing frictionally engaging said outer races of said bearing units.

3. The dental handpiece set forth in claim 1 further characterized by said seats of said casing and outer races of said bearing units having axially abutting portions to limit axial movement of said outer races toward each other when said rotor assembly is in operative position.

4. The dental handpiece set forth in claim 1 further characterized by said housing of said handpiece having port means to conduct gaseous fluid to and from the interior of said housing, said casing of said cartridge assembly also being provided with port means registrable with said port means of said housing, and interengaging indexing means respectively on said housing and casing operable to prevent rotating therebetween about the axis of the turbine rotor of the handpiece, thereby maintaining the port means of said housing and casing in registry with each other when assembled.

5. A dental handpiece comprising in combination, a handle having a housing on one end thereof connected thereto and provided with an opening therein; a fluid operated turbine rotor cartridge assembly comprising a fluid operated turbine rotor having vanes intermediately of the ends thereof, anti-friction bearing units having inner and outer races, the inner races thereof respectively receiving concentrically the opposite ends of said rotor, a casing surrounding the vanes of said rotor and the opposite end portions of said casing having annular seats respectively receiving the outer races of said bearings to maintain the same coaxial with said casing, said seats having faces extending transversely to the axis of said bearing units and abutting complementary faces respectively on the outer races of said bearing units to maintain the same spaced axially a predetermined precise distance, said cartridge assembly being removably mounted operatively within said housing and positionable therein as a unit by insertion thereof through said opening; and means operable to secure said cartridge assembly in operative position within said housing.

6. The dental handpiece set forth in claim 5 further characterized by said outer races of said bearing units extending axially outward from said seats in said casing, whereby the projecting outer end of one of said races is positioned to be engaged by said securing means and said housing of said handpiece having a seat within which the projecting outer end of the other outer race is received when said cartridge assembly is positioned operatively with said housing.

7. The dental handpiece set forth in claim 6 further characterized by said securing means comprising a cap threadable relative to the upper end of said housing to connect said cap thereto and close the opening therein and said cap having a portion engaging the upper end of the outer race of the upper bearing unit to clamp the rotor cartridge assembly within said housing.

8. The dental handpiece set forth in claim 7 further characterized by said cap having a peripheral skirt projecting axially from the inner end thereof and surrounding the projecting upper end of the outer race of the upper bearing unit for at least a portion of the length thereof.

9. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof respectively receiving concentrically the opposite ends of said rotor, a casing comprising two bi-partite sections at least one thereof surrounding the vanes of said rotor, the opposite end portions of said casing directly respectively engaging the outer races of said bearings in an axial direction to maintain the same spaced axially a predetermined precise distance, said cartridge assembly being removably mounted operatively within said housing and positionable therein as a unit by insertion thereof through said opening; and means operable to secure said cartridge assembly in operative position within said housing.

10. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof respectively receiving concentrically the opposite ends of said rotor, a casing comprising bi-partite sections abutting each other and at least one thereof surrounding the vanes of said rotor, the opposite end portions of said casing directly respectively engaging the outer races of said bearings to maintain the same spaced axially a predetermined precise distance, said cartridge assembly being removably mounted operatively within said housing and positionable therein as a unit by insertion thereof through said opening; and means operable to secure said cartridge assembly in operative position within said housing.

11. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof respectively receiving concentrically the opposite ends of said rotor, a casing comprising identical bipartite sections abutting each other in end-to-end relationship and surrounding the vanes of said rotor, the opposite end portions of said casing directly respectively engaging the outer races of said bearings to maintain the same spaced axially a predetermined precise distance, said cartridge assembly being removably mounted operatively within said housing and positionable therein as a unit by insertion thereof through said opening; and means operable to secure said cartridge assembly in operative position within said housing.

12. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearing units having inner and outer races, the inner races thereof respectively receiving concentrically the opposite ends of said rotor, a casing comprising bi-partite sections abutting each other and at least one thereof surrounding the vanes of said rotor, the opposite end portions of said bi-partite casing directly respectively engaging the outer races of said bearings to maintain the same spaced axially a predetermined precise distance and at least one of said end portions having a seat receiving the outer race of one of said bearings, said cartridge assembly being removably mounted operatively within said housing and positionable therein as a unit by insertion thereof through said opening, the interior of said housing having a key-receiving groove extending axially in one wall thereof, and key means extending axially between the bipartite sections of said casing and received within said groove to prevent relative rotation between said housing and casing; and means operable to secure said cartridge assembly in operative position within said housing.

13. A dental handpiece comprising in combination, a handle having a housing on one end thereof connected thereto and provided with an opening therein; a fluid operated turbine rotor cartridge assembly comprising a fluid operated turbine rotor having vanes intermediately of the ends thereof, anti-friction bearing units having inner and outer races, the outer races having radial flanges projecting outwardly and the inner races thereof respectively receiving concentrically the opposite ends of said rotor, a cylindrical casing surrounding the vanes of said rotor and the opposite end portions of said casing comprising annular seats respectively coaxially receiving the outer races of said bearings, the under faces of the flanges of said outer races abutting respectively the opposite ends of said casing to maintain said outer races spaced axially a predetermined precise distance, said cartridge assembly being removably mounted operatively within said housing and positionable therein as a unit by insertion thereof through said opening; and means operable to secure said cartridge assembly in operative position within said housing.

14. The dental handpiece set forth in claim 13 further characterized by said casing comprising a unitary tube having port means in the wall thereof for the passage of gaseous fluid therethrough.

15. A dental handpiece comprising in combination, a handle having a housing on one end thereof connected thereto and provided with an opening therein; a fluid operated turbine rotor cartridge assembly comprising a fluid operated turbine having vanes intermediate of the ends thereof, anti-friction bearing units having inner and outer races and anti-friction members therebetween, the outer races of said bearing having radial flanges thereon projecting outwardly from the cylindrical exterior of said outer races and the inner races thereof receiving concentrically the opposite ends of said rotor, a cylindrical casing surrounding the vanes of said rotor and the opposite ends of said casing respectively frictionally receiving the cylindrical exterior portions of said outer races and the end faces of said casing abutting the under faces of said flanges of said outer races of said bearings to space said bearings a precise predetermined distance axially, said cartridge assembly being removably mounted operatively within said housing and positionable therein as a unit by insertion thereof through said opening; and means carried by said housing and engageable with said cartridge assembly to secure said outer races of said bearings against said ends of said casing and said cartridge assembly in operative position within said housing.

16. A dental handpiece comprising in combination, a handle having a housing on one end thereof connected thereto and provided with an opening therein; a fluid operated turbine rotor cartridge assembly comprising a fluid operated turbine having vanes intermediate of the ends thereof, anti-friction bearing units having inner and outer races and anti-friction members therebetween, the outer races of said bearing units having radial flanges projecting outwardly from the outer ends of said races and the inner races of said units respectively receiving concentrically the opposite ends of said rotor, a casing complementary to the interior of said housing and surrounding the vanes of said rotor, the opposite ends of said casing respectively abutting the radial faces of said flanges of said outer races of said bearing units to space said outer races a precise predetermined distance axially and said cartridge assembly being removably mounted operatively within said housing and positionable therein as a unit by insertion thereof through said opening; and cap means for the opening of said housing releasably secured thereto and having a portion engaging the outer race of the upper bearing unit of said cartridge assembly to secure said outer races of said bearings against said ends of said casing and said cartridge assembly in operative position within said housing when said cap is secured to said housing.

17. The dental handpiece set forth in claim 16 further characterized by the diameter of the periphery of said flanges and exterior of said casing being substantially even and only slightly less than the diameter of the interior of said housing which receives said turbine cartridge assembly, whereby the inner wall of said housing maintains said outer races of said bearing units and casing substantially in axial alignment when said turbine cartridge assembly is mounted within said housing.

18. A dental handpiece comprising in combination, a handle having a housing on one end thereof secured thereto and provided with an opening therein; a fluid operated turbine rotor cartridge assembly comprising a fluid operated turbine rotor having vanes intermediately of the ends thereof, anti-friction bearing units having inner and outer races, the outer races having radial flanges projecting outwardly and the inner races thereof respectively receiving concentrically the opposite ends of said rotor, a cylindrical casing having an outer diameter greater than the peripheral diameter of the flanges of said outer races and surrounding the vanes of said rotor, the opposite end portions of said casing comprising annular seats respectively coaxially receiving the outer races and the end faces of said casing respectively abutting the under-surfaces of said flanges of said bearings to maintain said outer races spaced axially a predetermined precise distance, said cartridge assembly being removably mounted operatively within said housing and positionable therein as a unit by insertion thereof through said opening; and cap means having a peripheral skirt surrounding the flange of the upper bearing for a portion of the length thereof and said cap means being externally threaded for engagement with threads in the upper end of said housing removably to secure said cap thereto, whereby said cap abuts the outer race of the upper bearing to secure said cartridge assembly in operative position within said housing when said cap is secured to said housing.

19. A dental handpiece comprising in combination, a handle having a housing on one end thereof connected thereto and provided with an opening therein; a fluid operated turbine rotor cartridge assembly comprising a fluid operated turbine rotor having vanes intermediately of the ends thereof, anti-friction bearing units having inner and outer races, the inner races thereof respectively receiving concentrically the opposite ends of said rotor, casing means surrounding the vanes of said rotor and extending between the outer races of said bearings to maintain the same spaced axially a predetermined distance, at least one of the opposite end portions of said casing means having a seat receiving the outer race of one of said bearings to maintain the same coaxial with said casing, said cartridge assembly being removably mounted operatively within said housing and positionable therein as a unit by insertion thereof through said opening; and means engaging said housing and cartridge assembly and operable to secure said cartridge assembly in operative position with said housing.

References Cited in the file of this patent

UNITED STATES PATENTS

| | | |
|---|---|---|
| 2,180,993 | Monnier | Nov. 21, 1939 |
| 2,799,934 | Kern | July 23, 1957 |